Feb. 15, 1966 J. H. FRANCIS 3,235,150

COMBINED CINEMATOGRAPH CAMERAS OR PROJECTORS AND SOUND RECORDING OR REPRODUCING EQUIPMENT

Filed Oct. 16, 1963

4 Sheets-Sheet 1

Inventor

*John Henry Francis*

By *Roberts, Cushman & Grover*

Attorney

Inventor
John Henry Francis
By Roberts, Cushman & Grover
Attorney

Inventor
John Henry Francis
By
Roberts, Cushman & Grover
Attorney

Inventor
John Henry Francis
By
Roberts, Cushman & Grover
Attorney

United States Patent Office 3,235,150
Patented Feb. 15, 1966

3,235,150

COMBINED CINEMATOGRAPH CAMERAS OR PROJECTORS AND SOUND RECORDING OR REPRODUCING EQUIPMENT

John Henry Francis, Hounslow, Middlesex, England, assignor to Technicolor Corporation of America, Hollywood, Calif., a corporation of Maine Filed Oct. 16, 1963, Ser. No. 316,706
Claims priority, application Great Britain, Oct. 19, 1962, 39,624/62
2 Claims. (Cl. 226—44)

This invention relates to and is concerned only with the more usual kind of cinematograph camera or projector in which the film is moved intermittently, frame by frame past a projection gate.

In cinematograph picture and sound recording and reproducing apparatus of the kind with which the invention is concerned and employing a sound record on the picture film, it is necessary that the sound record should be advanced past a sound pick-up at a substantially constant linear speed which is equal to the average linear speed at which the picture record is advanced by the intermittent mechanism past the camera or projector gate. Only small variations and variations of sub-audible frequency of the speed of the sound record are permissible. The object of the present invention is to provide simple and effective means by which the average speed of the intermittent mechanism that advances the picture film and the substantially constant speed of the sound record may be equalized with one another.

According to the present invention, a combined cinematograph camera or projector and sound recording or reproducing equipment comprises an intermittent film-advancing mechanism and a constant speed film-conveying device, a motor arranged to drive the intermittent film-advancing mechanism, a separate motor arranged to drive the constant speed film-conveying device, an electromagnetically operated brake operating on one of said motors so as to control the speed thereof, a light source and a photo-responsive device, a feeler adapted to co-operate with the loop of film ordinarily formed between the intermittent film-advancing mechanism and the constant speed film-conveying device so as to be moved thereby in response to variations in size of the loop, and a shutter actuated by the feeler and effectively interposed between the photo-responsive device and the light source, so as to vary the amount of light from the source that impinges on the photo-responsive device, the photo-responsive device being connected to control the energization of the electromagnetically operated brake. The feeler, shutter and photo-responsive device are so arranged with respect to one another and the photo-responsive device is so connected with the electromagnetic brake (if desired through an amplifier) that shortening of the loop between the intermittent film-advancing device and the constant speed film-conveying device results in changed application of the electromagnetic brake, so as to permit acceleration of the constant speed film-conveying device and the constant speed sound record relatively to the intermittent film-advancing device. In practice, it is preferred that the brake be applied to the motor that drives the intermittent film-advancing device, in which case the arrangement is such that, if the loop with which the feeler co-operates is anterior to the intermittent film-advancing device, contraction of that loop results in retardation of the motor driving the intermittent film-advancing device; or, if the loop is formed in the film after it leaves the intermittent film-advancing device, the motor driving the intermittent film-advancing device is accelerated.

For the better understanding of the invention, one particular embodiment of it will now be described with reference to the accompanying drawings, in conjunction with a projector for 8 mm. picture film bearing a magnetic sound track on one edge in which projector the constant speed film-conveying device is incorporated in a film storage casette as described in my co-pending application Serial No. 316,707 of even date.

In the accompanying drawings which are partly diagrammatic:

Figure 1:
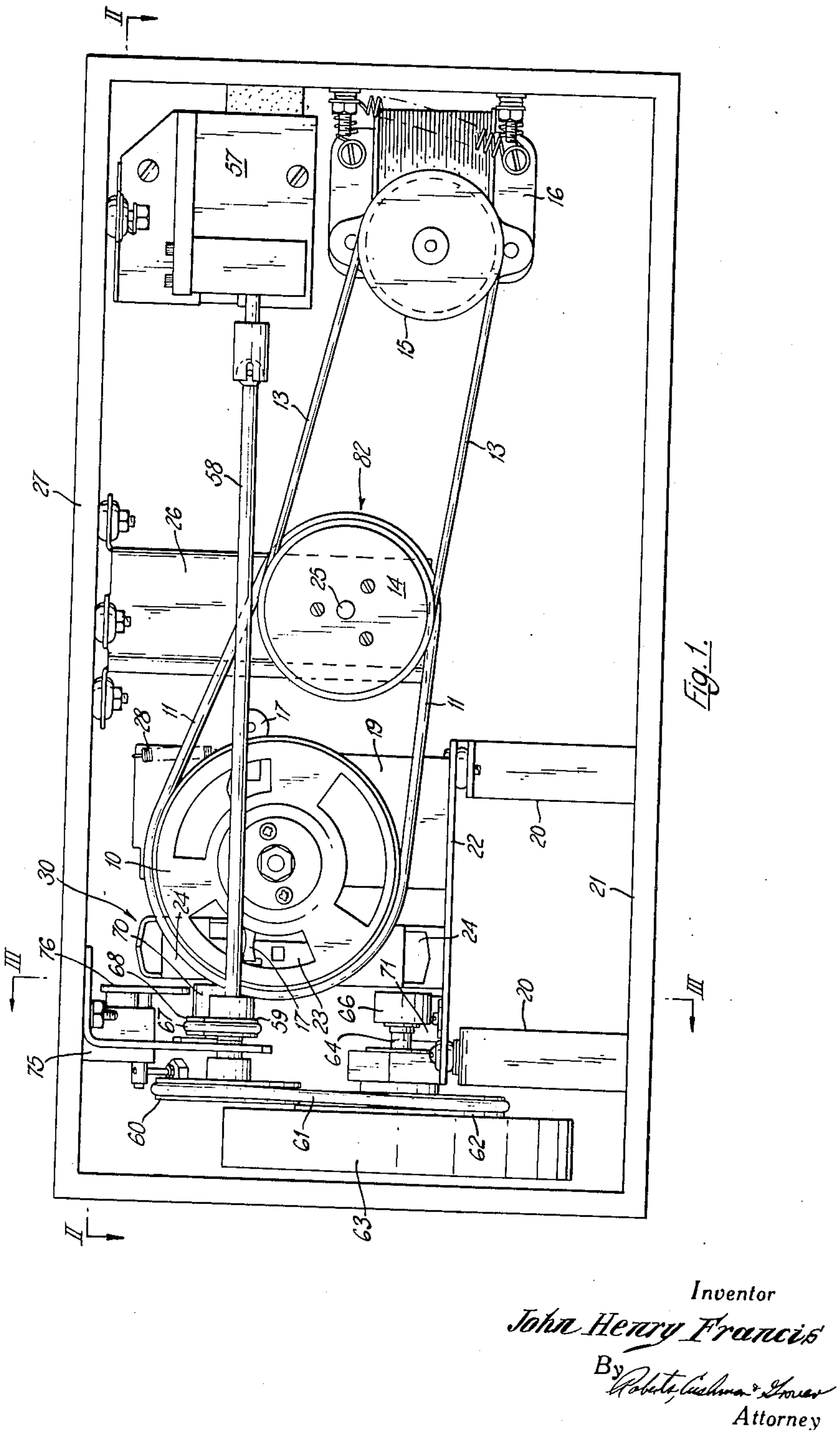
FIG. 1 is a side elevation of the projector with the side walls, cooling fan and projection lens omitted.
Figure 2:
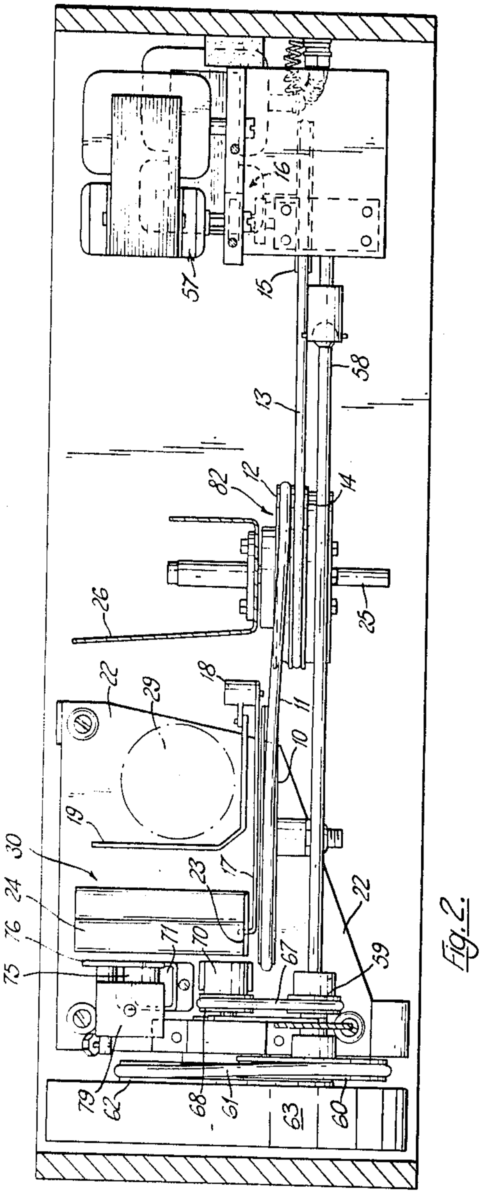
FIG. 2 is a section on the line II—II of FIG. 1.
Figure 3:
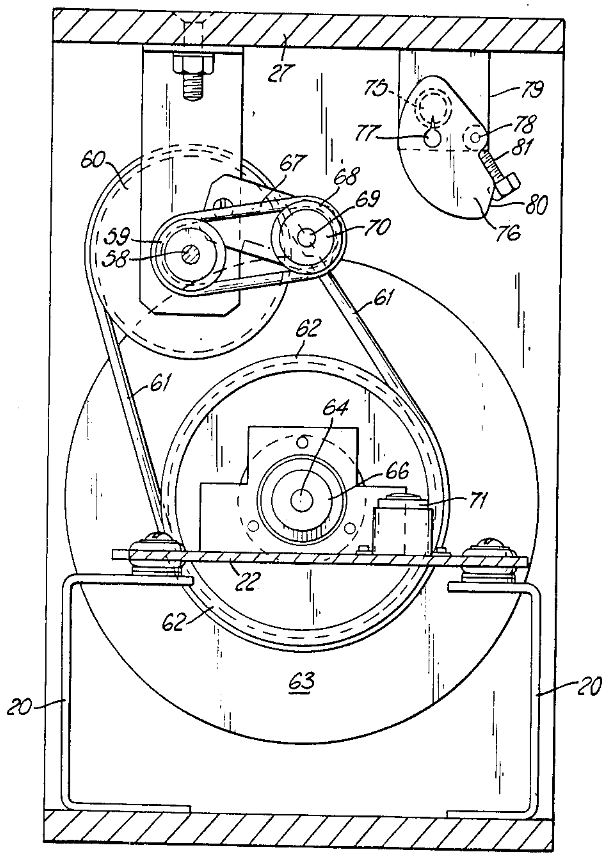
FIG. 3 is a section on the line III—III of FIG. 1.

Referring now particularly to FIGS. 1, 2 and 3 of the accompanying drawings, the projector shutter 10 is rotated by a linkage including a belt 11 embracing the grooved periphery of the shutter 10 and a grooved pulley 12 which is integral with a pulley 14 driven by a belt 13 embracing its grooved periphery and that of a pulley 15 that is keyed to the shaft of an electric motor 16. The pulleys 12 and 14 are journalled on a shaft 25 carried by a bracket 26 from the top 27 of the projector. A claw 17 for advancing the film is pivoted upon a boss 18 which is secured to a lamp screen 19 mounted on a platform 22 carried by pedestals 20 on the base 21 of the projector.

The claw 17 is biassed by a spring 28 and is reciprocated in conventional manner by a cam plate, not shown, secured to the rear (as shown in FIG. 1) of the shutter 10. The projector gate, indicated generally in FIG. 1 by the reference 23, forms part of a detachable unitary assembly comprising a chute 24 that is shown in more detail in FIGS. 5 and 6. The chute 24 receives a magazine, such as that described in said co-pending application, and presents the cinematograph film to the gate 23. A projection lamp indicated in chain lines at 29 is mounted in a holder on the platform 22.

Figures 4, 5, 6, 9:
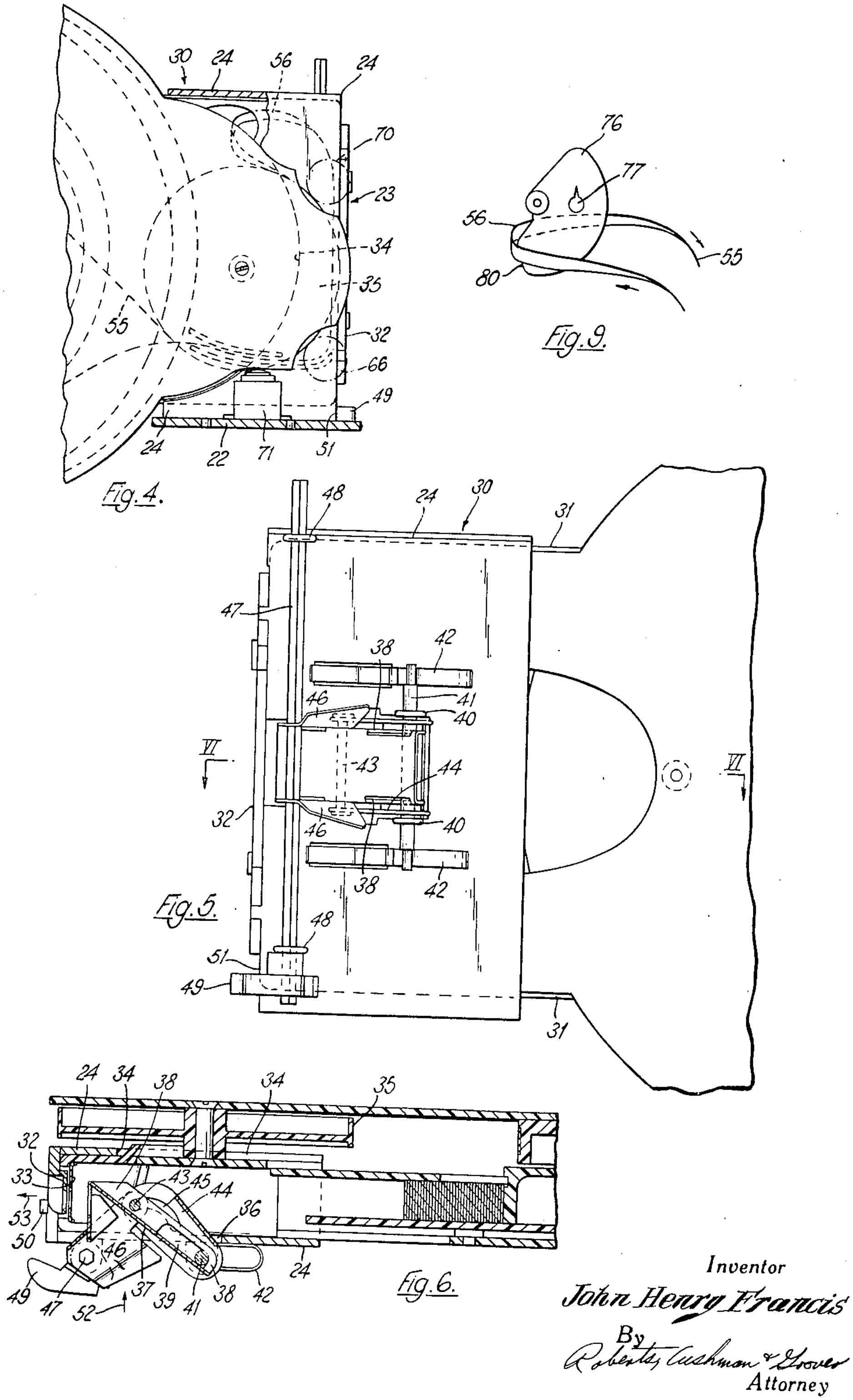
FIG. 4 is an elevation of the chute (partly broken away) shown in FIG. 1 and FIG. 2 with part of the casette and constant speed film-conveying device.
FIG. 5 is an enlarged view of the side of the chute and associated parts opposite to that shown in FIG. 4.
FIG. 6 is a section on the line VI—VI of FIG. 5.
FIG. 9 is a partial diagrammatic view illustrating the engagement of the feeler with the loop of the film.

Referring now particularly to FIGS. 4, 5 and 6, the projector comprises a detachable assembly 30 consisting of the chute 24 into which the rectangular extension 31 of a casette of the general kind described in said co-pending application may be inserted. The chute 24 is in the nature of a box open at one end to receive the extension 31 of the casette, having an apertured gate plate 32 and having a large opening bounded by the edge 34 to clear the constant speed film-conveying device 35 of the casette. One side wall of the box is apertured to admit a movable mirror 37. The movable mirror 37, which may be of polished aluminum or stainless steel, has flanges 38 at its two sides. The flanges 38 have slots 39 which embrace a rod 41 that is maintained in a fixed position in bearing lugs 40 by leaf springs 42. A rod 43 is mounted transversely in the flanges 38 and its projecting ends engage arcuate slots 45 in levers 44 journalled on the rod 41. The projecting ends of the rod 43 also engage holes in cheeks 46 which are secured to a spindle 47 that is rotatably supported in bearing lugs 48 mounted upon the side of the chute 24. The lower end of the spindle 47 has fixed to it a claw 49. The spindle 47 is rotationally biassed by a spring, not shown, so that the parts assume the positions shown in FIG. 6.

When a casette is inserted into the chute, its lower leading edge 51 (FIG. 4) contacts edges of the levers 44 and rotates them anti-clockwise to retract them and the mirror 37 out of the path of the nose of the casette, this movement being limited by engagement of a claw 49 with a resilient stop 50. When the nose of the casette has passed fully into the chute 24, the bias restores the parts to the position shown in FIG. 6, projecting the mirror 37 into the chute, so that it reflects, in the direction indicated by the arrow 53, light from the lamp 23 impinging on it in the direction indicated by the arrow 52.

The casette comprises a constant speed film-conveying device in the form of a cylindrical drum 35. This drum is rotated in a manner later to be described. The film 55 enwraps a major portion of the periphery of the drum 35 to which it is delivered from the storage portion of the casette as described in said co-pending application. From the periphery of the drum 35 the film 55 passes in a loop 56 to the projector gate 23 over a pressure plate 33 of the casette, past which it is intermittently advanced by reciprocation of the claw 17 which engages the perforations of the film in the usual manner. On leaving the gate 23, the film 55 passes back into the casette in which it is wound as described in said co-pending application.

The constant speed drum 35 is rotated at a controlled substantially constant speed by a separate electric motor 57. The shaft of the motor 57 is connected by a shaft 58 to a small pulley 59 and to a larger pulley 60. The larger pulley 60 is coupled by a flexible belt 61 to a pulley 62 formed integrally with a flywheel 63 and keyed to a shaft 64. The flywheel 63 serves, in conjunction with the inherent elasticity of the belt 59, to smooth out fluctuations of speed of the shaft 64. A friction roller 66 is also keyed to the shaft 64. The small pulley 59 is coupled by a belt 67 to a pulley 68 keyed to a shaft 69, to which also is keyed a second friction roller 70. The arrangement is preferably such that the peripheral speed of the friction roller 70 is slightly higher than that of the friction roller 66. This may be achieved by a difference in the diameters of the two rollers, or preferably by a difference in diameters of the pulleys 60 and 62, the pulley 62 being larger than the pulley 60. When the casette containing film 55 is in position in the chute 24 of the projector, the rollers 66 and 70 bear against the film 55 where it embraces the periphery of the constant speed drum 35, as indicated in FIG. 4, thus to draw the film 55 from the casette, rotating the drum 35. Owing to the difference in the peripheral speeds of the rollers 66 and 70, one or both of which slip slightly on the surface of the film, the bight of the latter embracing the constant speed drum 35 is maintained under tension and therefore in close contact with the periphery of the drum 35. As shown in FIG. 4, an electromagnetic pick-up device 71 is mounted on the platform 22 so as to co-operate with the sound track of the film 55 where it is in contact with the periphery of the constant speed drum 35.

It is essential that the speed of the film 55 past the electromagnetic device 71 should be equal to the average speed of the film 55 as advanced step by step by the claw 17 past the projector gate 23.

Be it noted however that the particular arrangement illustrated is such that the motor 16 by which the film 55 is advanced step by step tends so to advance the film 55 at a slightly greater average linear speed than the linear speed at which the motor 57 drives the film 55 continuously. In order precisely to equalize the average linear speed at which the film 55 is advanced step by step by the claw 17 with the linear speed at which the motor drives the film 55 at the constant speed film-conveying device 35, advantage is taken of the average variations of the size of the loop 56 consequent upon any variations of the two speeds referred to. To this end, the drive from the motor 16 to the shutter 10 and claw 17 is provided with an electromagnetic brake 82 such as to control, by reducing, the speed thereof. This electromagnetic brake is controlled by a photo-responsive device, the light falling upon which from a light source, is governed by a shutter actuated by a feeler co-operating with the loop 56 of the film 55 ordinarily formed between the constant speed sound-record conveying device 35 and the intermittent film-advancing mechanism. In the present embodiment of the invention, the electromagnetic brake 82 is combined with the pulleys 12 and 14, as shown in FIG. 7.

Figure 7:
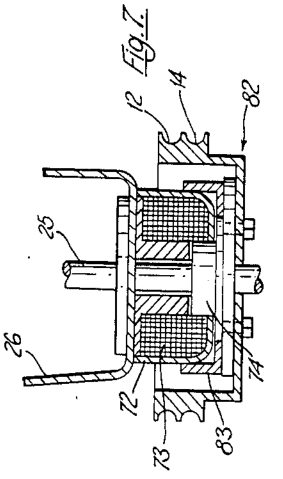
FIG. 7 is a section of an electromagnetic brake suitable for employment in carrying out the invention.
Figure 8:
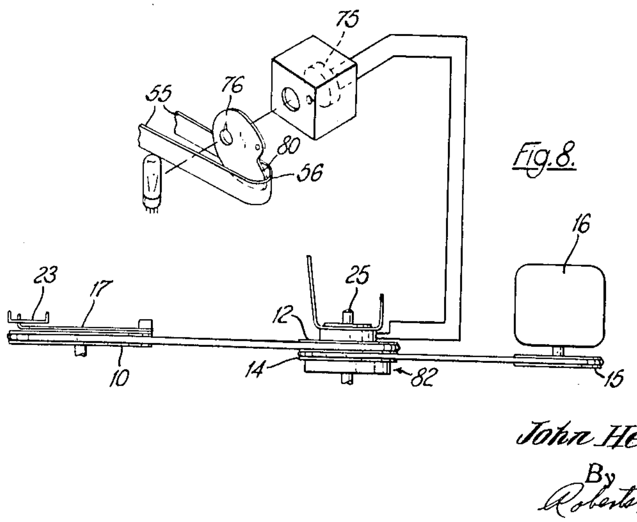
FIG. 8 is a diagram showing the electrical circuit of the electromagnetic brake and photo-responsive device.

Referring to FIG. 7, a conventional pot-magnet 72 having an energizing coil 73 is mounted upon the bracket 26 and embraces the shaft 25. A ferro-magnetic armature 74 is secured in a hollow boss of the pulleys 12 and 14, and bears a brake shoe 83 which co-operates frictionally with the end of the pot-magnet 72. The coil 73 of the pot-magnet 72 is so connected as to be energized in dependence upon the output of a photo-responsive device in the form of a photoelectric cell 75 as indicated in FIG. 8. If desired, an amplifier, not shown, may be included between the cell 75 and the energizing coil 73 of the pot-magnet. A pivoted shutter 76 having an aperture 77, preferably of ovoid shape, is mounted adjacent the photoelectric cell 75, so as partially or wholly screen it from light, which, in the case shown, is stray light from the projection lamp 29. This shutter is keyed to a spindle 78 pivoted in a bracket 79 fixed to the top 27 of the projector casing. The shutter 76 combines, in the case shown, a feeler in the form of an edge 80 that, when the casette is in position in the chute 24, co-opreates with the loop 56 of the film 55 as indicated in FIG. 9. The combined shutter 76 and feeler 80 are biassed by a counterweight in the form of a set screw 81 towards an attitude in which, in the absence of film 55 or when the loop 56 is large, the photo-responsive device is screened. If, therefore, the loop 56 is large, due to the portion of the film 55 where it is in contact with the constant speed film-conveying device 35 leading the portion passing through the gate, the output of the photo-responsive device is at a minimum. In these conditions the pot-magnet 72 is de-energized or nearly so and the electromagnetic brake 82 is barely or not at all applied. Thus the action of the claw 17, driven by the motor 16 is speeded up. When, on the other hand, the loop 56 is contracted, the shutter 76 is rotated by the feeler edge 80 so as to present increasing amounts of the aperture 77 to the photo-responsive device 75. The output of the photo-responsive device 75 and consequently the energization of the pot-magnet 72 is thus increased, whereby the brake 82 is applied to the pulleys 12 and 14, thus to retard the motor 16 and to retard the action of the claw 17 in advancing the film intermittently. It may be remarked that, owing to the normal intermittent fluctuation of the size of the loop 56 as the film 55 is intermittently advanced by the claw 17, the position of the shutter 76 usually fluctuates at picture-frame frequency. If a cadmium sulphide photoelectric cell be employed, as is preferred, its slow response largely eliminates fluctuation of its response and therefore of the energization of the pot-magnet 72 and consequently little or no fluctuating application of the brake 82 to the pulleys 12 and 14 occurs. Moreover, it is smoothed out by the inertia and elasticity of the drive between the pulleys 12 and 14 and the projector shutter 10. Such fluctuation as may occur is, however, immaterial, since it does not affect the speed of the constant speed film-conveying device 35. By the action of the electromagnetic brake, therefore, the average speed or advance of the film 55 through the projector gate by the claw 17 is caused to be equal to the linear speed of the film past the photoelectric pick-up device 71. Thus the normal intermittent fluctuations in the film loop size are averaged out in a servo loop comprising the shutter 76, the feeler 80, photocell 75, the brake 82 and the linkage between the motor 16 and claw 17.

In the particular case that has been described with reference to and illustrated in the drawings, the arrangement is such that the film-advancing device 17, when not subject to retardation by the electromagnetic brake 82, tends to advance the film 55 at an average speed somewhat greater than the constant speed imparted to it by the constant speed motor 57 and friction rollers 66 and 70; the photoelectric pick-up device 71 and constant speed film-conveying device 35 are arranged in the run of the film 55 anterior to the projector gate and intermittent film advancing device or claw 17. Consequently the brake 82 acts on the drive of the intermittent film advancing device or claw 17. However, in a similar arrangement, the film advancing device 17 might drive the film at a somewhat lower average linear speed than it is moved by the constant speed motor 57, in which case the brake 82 would be applied to the drive imparted to the drum 35 by the motor 57. Also the constant speed drum 35 and the loop 56 might be located after the intermittent drive by the claw 17 of the film 55 past the gate 23. In this case, assuming the brake 82 to be applied to the intermittent drive of the claw 17, the arrangement of the shutter 76, photo-responsive device 75 and the connections to the winding 73 of the brake 82 would be such that increase in average size of the loop would cause increased application of the brake 82 so as to retard the drive of the intermittent film-feeding device or claw 17, when it is associated with that drive; or, if associated with the drive to the drum 35 to increase the speed of that drum.

It will be appreciated that the application of the invention in one particular manner to one particular form of combined sound and picture cinematograph projector has been described with reference to and illustrated in the accompanying drawings by way of example only, and that many modifications may be made without departing from the scope of the invention as defined in the appended claims.

What I claim is:

1. Apparatus for feeding a cinematographic sound and picture record film comprising an intermittent film-advancing mechanism and a constant speed film-conveying device, a first motor, a linkage between the first motor and intermittent mechanism arranged to drive the intermittent film-advancing mechanism, a separate motor arranged to drive the constant speed film-conveying device, said mechanism and device advancing the film with a loop of film therebetween with normal intermittent fluctuations in the size of the film loop, an electromagnetically operated brake operating on said first motor so as to control the speed of said intermittent mechanism, a light source and a photo-responsive device, a feeler adapted to co-operate with the loop of film so as to be moved thereby in response to variations in size of the loop, and a shutter actuated by the feeler and effectively interposed between the photo-responsive device and the light source, so as to vary the amount of light from the source that impinges on the photo-responsive device, the photo-responsive device being connected to control the energization of the electromagnetically operated brake, said shutter, feeler, photo-responsive device, brake and linkage comprising a servo loop, said servo loop including means to average out the normal intermittent fluctuations in the film loop size, thereby to maintain the average speed of the film past the intermittent mechanism equal to its speed past the constant speed device.

2. Apparatus for feeding a cinematographic sound and picture record film comprising an intermittent film-advancing mechanism and a constant speed film-conveying device, a first motor, a linkage between the first motor and intermittent mechanism, arranged to drive the intermittent film-advancing mechanism, a separate motor arranged to drive the constant speed film-conveying device, said mechanism and device advancing the film with a loop of film therebetween with normal intermittent fluctuations in the size of the film loop, an electromagnetically operated brake operating on said first motor so as to control the speed of said intermittent mechanism, a light source and a photo-responsive device, a feeler adapted to co-operate with the loop of film so as to be moved thereby in response to variations in size of the loop, and a shutter actuated by the feeler and effectively interposed between the photo-responsive device and the light source, so as to vary the amount of light from the source that impinges on the photo-responsive device, the photo-responsive device being connected to control the energization of the electromagnetically operated brake, said photo-responsive device having a slow response relative to each of said normal fluctuations of the loop size so as to average out the normal intermittent fluctuations in the film loop size, thereby to maintain the average speed of the film past the intermittent mechanism equal to its speed past the constant speed device.

References Cited by the Examiner

UNITED STATES PATENTS

| | | | |
|---|---|---|---|
| 1,964,874 | 7/1934 | Fankboner | 250—231 X |
| 1,998,931 | 4/1935 | Kellogg | 226—195 X |
| 2,166,551 | 7/1939 | Perry | 226—45 X |
| 2,393,015 | 1/1946 | Bendz | 226—45 X |

M. HENSON WOOD, JR., *Primary Examiner.*

ROBERT B. REEVES, *Examiner.*